Patented Mar. 13, 1923.

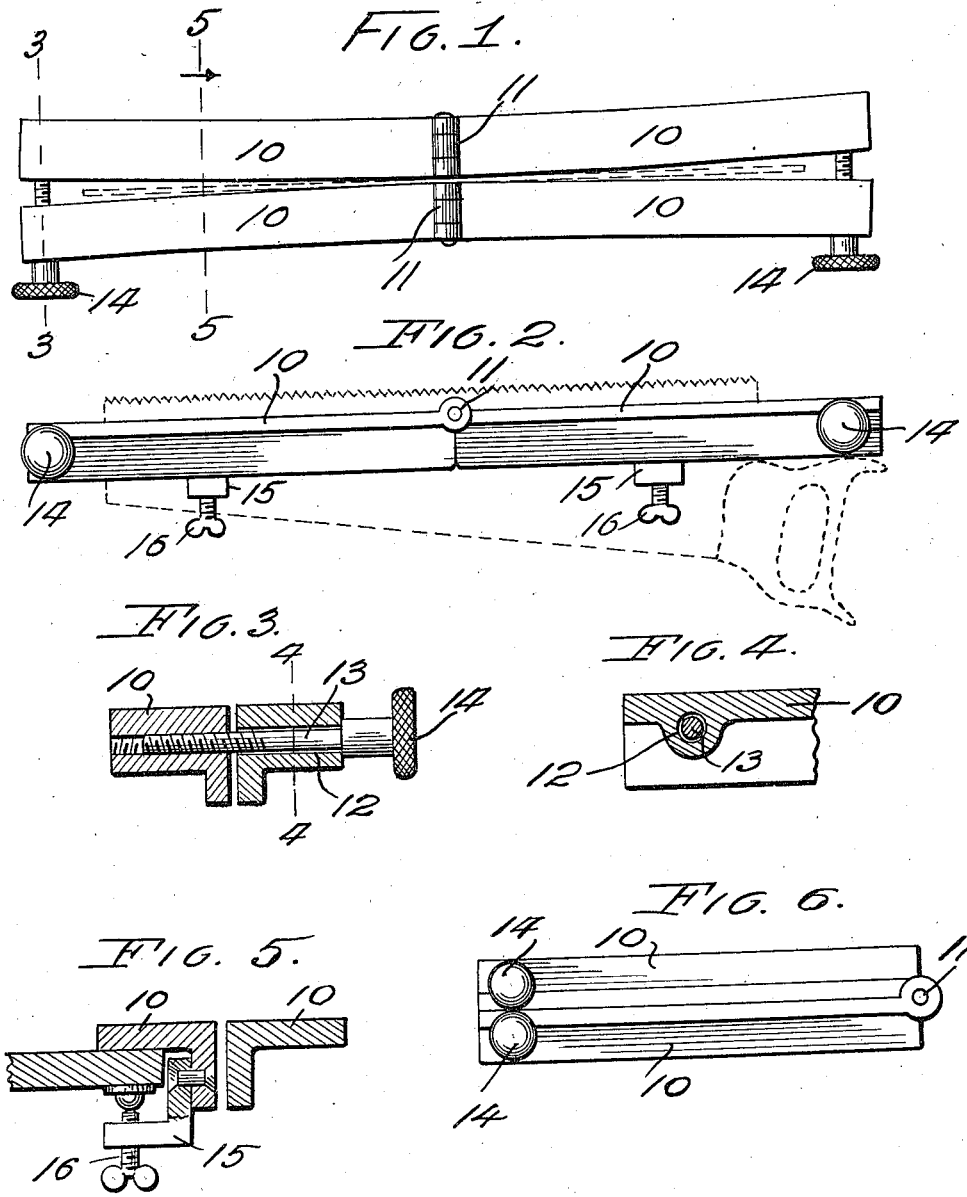

1,448,483

UNITED STATES PATENT OFFICE.

ARTIMUS E. ELLIOTT, OF LOS ANGELES, CALIFORNIA.

COLLAPSIBLE SAW CLAMP.

Application filed October 31, 1921. Serial No. 511,741.

*To all whom it may concern:*

Be it known that I, ARTIMUS E. ELLIOTT, a citizen of the United States, residing at Los Angeles, in the county of Los Angeles and State of California, have invented new and useful Improvements in Collapsible Saw Clamps, of which the following is a specification.

My invention relates to a collapsible saw clamping device the principal objects of my invention being to provide a relatively simple, practical device that may be easily and cheaply produced and which will be effective in firmly clamping and holding the blades of hand saws while the same are being sharpened and set.

A further object of my invention is to provide a device of the character described that may be folded or collapsed, so as to occupy relatively little space when packed for storage or transportation.

With the foregoing and other objects in view, my invention consists in certain novel features of construction and arrangement of parts that will hereinafter be more fully described and claimed and illustrated in the accompanying drawings in which:

Fig. 1 is a top plan view of a collapsible saw clamp of my improved construction.

Fig. 2 is an elevational view of the clamp.

Fig. 3 is an enlarged cross section taken on the line 3—3 of Fig. 1.

Fig. 4 is a detail section taken on the line 4—4 of Fig. 3.

Fig. 5 is an enlarged cross section taken on the line 5—5 of Fig. 1.

Fig. 6 is an elevational view of the clamp in collapsed or folded condition.

Referring by numerals to the accompanying drawings which illustrate a practical embodiment of my invention 10, 10 designate rail sections, preferably of inverted L-shape in cross section, the inner ends of which are connected by a transverse hinge 11, so that one section may be folded over onto the other section.

The two sections combine to form an elongated rail and two of said rails are arranged side by side to form the body of the clamp. The two rails are positioned so that the vertically disposed flanges of the inverted L-shaped sections are arranged at the inner edges of the rails, thus providing relatively broad saw blade clamping faces and the central portions of the two rails are curved or bowed inwardly toward each other, so that normally the central portions of said rails are closer together than their end portions.

Extending through openings in the ends of one of the rails are clamping screws 13, the threaded end portions of which engage in threaded apertures in the end portions of the other rail. The outer ends of the screws are provided with small hand wheels 14, which may be manually engaged when the screws are rotated.

Pivotally secured to the sections 10 of one of the clamping rails are the upper ends of a pair of L-shaped brackets 15 and screw seated in the lower horizontal portions of said brackets are clamping screws 16, that are adapted to clamp the edge of a table or like support against the adjacent horizontal flange of the rail 10, as seen in Fig. 5, thereby firmly securing the device when the same is to be used.

To clamp the blade of a saw when the same is to be sharpened or set, said blade is positioned between the rails 10 and screws 13 are now rotated to force the end portions of said rails toward the interposed saw blade and as said screws are tightened the bowed or curved rails will tend to straighten out and consequently firmly clamp the saw blade throughout its length. The position of a saw when clamped in the device is shown by dotted lines in Fig. 2.

While not in use the parts of the clamp may be folded together as illustrated in Fig. 6 and when so folded the device occupies comparatively little space within a tool box or the like.

A saw clamp of my improved construction is relatively simple in structure, may be easily and cheaply produced and is very effective in performing its intended functions.

Various changes may be made in the details of construction of my improved saw clamping device without departing from the spirit of the invention as set forth in the appended claims.

I claim as my invention:

1. In a saw clamping device a pair of rails, each provided at its center with a hinge, clamping screws for drawing said rails together, and means on one rail for clamping the device on a support.

2. In a saw clamping device a pair of rails, each formed in two parts, the inner ends of said parts being hinged to each other, means on one of the rails for securing the same to a support and clamping screws passing through the ends of the rails.

ARTIMUS E. ELLIOTT.